(12) United States Patent
Chen et al.

(10) Patent No.: US 7,948,877 B2
(45) Date of Patent: May 24, 2011

(54) SYSTEMS AND METHODS FOR PACKET FORWARD CONTROL

(75) Inventors: Wei-Pin Chen, Taipei (TW); Hung-Chi Huang, Taipei (TW); Ming-Chao Chung, Taipei (TW); Chun-Cheng Wang, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 651 days.

(21) Appl. No.: 11/470,648

(22) Filed: Sep. 7, 2006

(65) Prior Publication Data

US 2008/0062960 A1   Mar. 13, 2008

(51) Int. Cl.
*H04L 1/00* (2006.01)
(52) U.S. Cl. .......................................... 370/229; 370/422
(58) Field of Classification Search .................. None
See application file for complete search history.

(56) References Cited

U.S. PATENT DOCUMENTS

| | | | | |
|---|---|---|---|---|
| 5,838,677 A * | 11/1998 | Kozaki et al. | | 370/389 |
| 6,625,121 B1 * | 9/2003 | Lau et al. | | 370/230 |
| 6,856,595 B1 * | 2/2005 | Brown | | 370/229 |
| 7,046,632 B2 * | 5/2006 | Chen et al. | | 370/236 |
| 7,227,862 B2 * | 6/2007 | Kalkunte et al. | | 370/389 |
| 2001/0043565 A1 * | 11/2001 | Chen et al. | | 370/230 |
| 2003/0147347 A1 * | 8/2003 | Chen et al. | | 370/229 |
| 2003/0174701 A1 * | 9/2003 | Angle et al. | | 370/390 |
| 2005/0047334 A1 * | 3/2005 | Paul et al. | | 370/229 |
| 2006/0104275 A1 * | 5/2006 | Dohm | | 370/390 |
| 2008/0212472 A1 * | 9/2008 | Musacchio et al. | | 370/232 |

* cited by examiner

*Primary Examiner* — Kevin C Harper
(74) *Attorney, Agent, or Firm* — Thomas/Kayden

(57) ABSTRACT

Systems and methods for packet forward control. The system comprises a plurality of ports and a processing module configured to receive a packet. The processing module comprises a resource management module and a forward control module. The resource management module detects whether congestion occurs on at least one specific port among the ports. The forward control module determines whether the specific port comprises a predetermined port within the ports, and if so, forwards the packet to at least one of the ports excepting the predetermined port.

13 Claims, 6 Drawing Sheets

| 0 | 1 | 0 | 1 | 0 | 1 | 0 |

FIG. 4A

| 0 | 1 | 0 | 0 | 0 | 0 | 0 |

FIG. 4B

| 0 | 1 | 0 | 0 | 0 | 1 | 0 |

FIG. 4C

| 0 | 1 | 0 | 0 | 0 | 0 | 0 |

FIG. 4D

| 0 | 0 | 0 | 1 | 0 | 1 | 0 |

FIG. 4E

SYSTEMS AND METHODS FOR PACKET FORWARD CONTROL

BACKGROUND OF THE INVENTION

1. Field of the Invention

The disclosure relates generally to network transmission, and, more particularly, to systems and methods for packet forward control.

2. Description of the Related Art

In network transmission, a switch has multiple ports to connect multiple packet switched network segments and forward data packets based on MAC addressing. When a packet is received from a port, the switch selectively transmits the packet from specific ports based on the destination MAC address recorded in the packet. If the destination MAC address is unknown, for example, a broadcast address, the switch transmits the packets to all of the ports except the incoming port. If the destination port is the same as the originating port, the packet is filtered out and not forwarded. If a multicast packet comprising several destination MAC addresses is received, the packet is forwarded to the corresponding ports in the MAC address table.

In data networking and queuing theory, congestion occurs when incremental increases in offered load lead either only to small increases in network throughput, or to an actual reduction in network throughput. The network situation results in serious negative impact on network performance. FIG. 1A is a schematic diagram illustrating packet multicasting. In FIG. 1A, port 0 transmits packets to ports 5, 7 and 9 in a switch. Ports 7 and 9 connect to hosts operated at 100 MHz, and port 5 connects to a host operated at 10 MHz. It is noted that B1, B2 and B3 represent output queues of ports 5, 7 and 9, respectively, and line TH represents a threshold value of output queue indicating a congestion status on the port. Since port 5 operates at 10 MHz, port 5 accumulates many packets in buffer B1, and causes packets in output queue B1 to approach the congestion status threshold value TH, resulting in port 5 congestion. In a conventional packet forward control, port 5 transmits a flag to the MAC (port 0) that caused port 5 congestion. After receiving the flag, port 0 transmits a pause frame to a host connected thereto, and stops the host from transmitting the packet again, as shown in FIG. 1B. That is, conventional packet forward control stops all packet transmissions among the ports. The congestion, however, is due to the speed of port 5, the performance of the switch is also degraded for port 0 transmitting packets to other ports. Additionally, some ports act as sniff ports for some applications. The sniff ports monitor the packet content transmission between specific ports, and easily become congestion. After congested, a port transmitting packets to the sniff ports receives a pause frame, and cannot transmit packets to all ports again.

BRIEF SUMMARY OF THE INVENTION

Systems and methods for packet forward control are provided.

An embodiment of a system for packet forward control comprises a plurality of ports and a processing module configured to receive a packet. The processing module comprises a resource management module and a forward control module. The resource management module detects whether congestion occurs on at least one specific port among the ports. The forward control module determines whether the specific port comprises a predetermined port within the ports, and if so, forwards the packet to at least one of the ports excepting the predetermined port.

In an embodiment of a method for packet forward control, a packet is received. It is determined whether congestion occurs on at least one specific port among a plurality of ports. It is determined whether the specific port comprises a predetermined port within the ports. If so, the packet is forwarded to at least one of the ports excepting the predetermined port.

Systems and methods for packet forward control may take the form of program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein:

FIG. 4A is a schematic diagram illustrating an example of a forward port mask;

FIG. 4B is a schematic diagram illustrating an example of a congestion port window;

FIG. 4C is a schematic diagram illustrating another example of a congestion port window;

FIG. 4D is a schematic diagram illustrating an example of a suppression port mask;

FIG. 4E is a schematic diagram illustrating an example of a forward port window.

DETAILED DESCRIPTION OF THE INVENTION

Systems and methods for packet forward control are provided.

Figure 2:
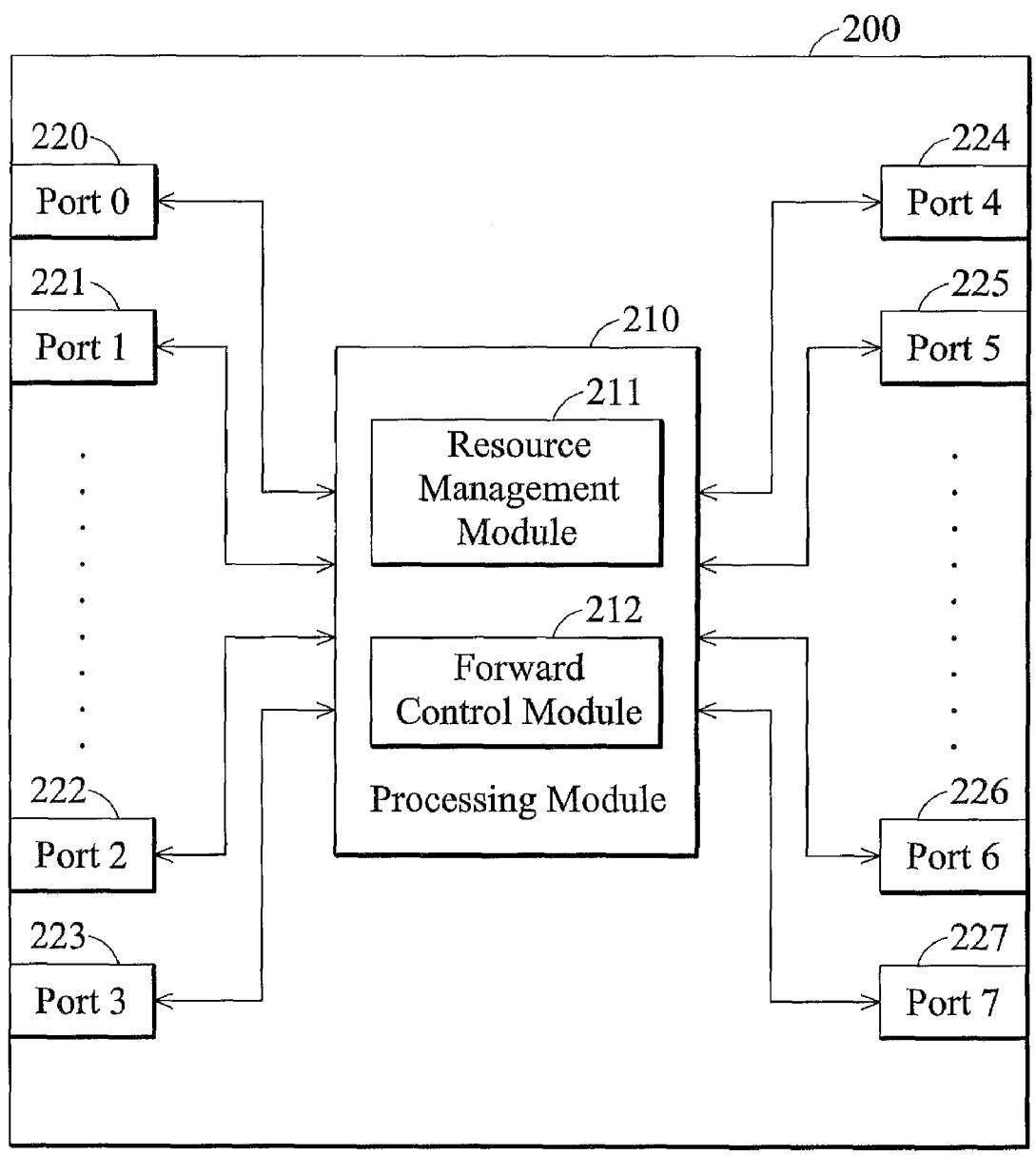
FIG. 2 is a schematic diagram illustrating an embodiment of a system for packet forward control.

FIG. 2 is a schematic diagram illustrating an embodiment of a system for packet forward control. The system 200 may be a network switch. The system 200 comprises a plurality of ports (220, 221, 222, 223, 224, 225, 226 and 227) and a processing module 210. Each port connects to various interfaces and devices and receives packets therefrom. The received packets are transmitted to the processing module 210 for further processing such as forwarding or dropping. Additionally, each port has an output queue buffering packets forwarded from the processing module 210. It is noted that any port can be set as a predetermined suppression port, where a packet forwarded to the port can be dropped if the port is congested. Therefore, a suppression port mask comprising a plurality of bits, each representing whether a respective port is a suppression port, is set and provided. FIG. 4D is a schematic diagram illustrating an example of a suppression port mask 440, where 7 ports are in a switch, and bits 0~6 respectively represent ports 0~6. In this example, port 1 is a suppression port since bit 1 is 1 and others are 0.

The processing module 210 comprises a resource management module 211 and a forward control module 212. The resource management module 211 detects whether congestion occurs on any port by determining whether the number of packets in corresponding output queue of the port approaches a predetermined threshold value. In some embodiments, when congestion occurs, the resource management module 211 generates a congestion port window comprising a plurality of bits, each representing whether a respective port is congested. FIG. 4B is a schematic diagram illustrating an example of a congestion port window 420, where 7 ports are in a switch, and bits 0~6 respectively represent ports 0~6. In this example, congestion occurs on port 1 since bit 1 is 1 and others are 0. The forward control module 212 comprises a MAC address table and a forwarding table (not shown) forwarding packets between the ports. In some embodiments, when a packet is received, the forward control module 212 generates a forward port mask comprising a plurality of bits, each representing whether a respective port should be forwarded with the packet. The forward port mask is generated according to the destination addresses recorded in the packet. FIG. 4A is a schematic diagram illustrating an example of a forward port mask 410, where 7 ports are in a switch, and bits 0~6 respectively represent ports 0~6. In this example, a packet is forwarded to ports 1, 3 and 5 since bits 1, 3 and 5 are 1 and others are 0. Details on the processing module 210 are discussed later.

Figure 3:
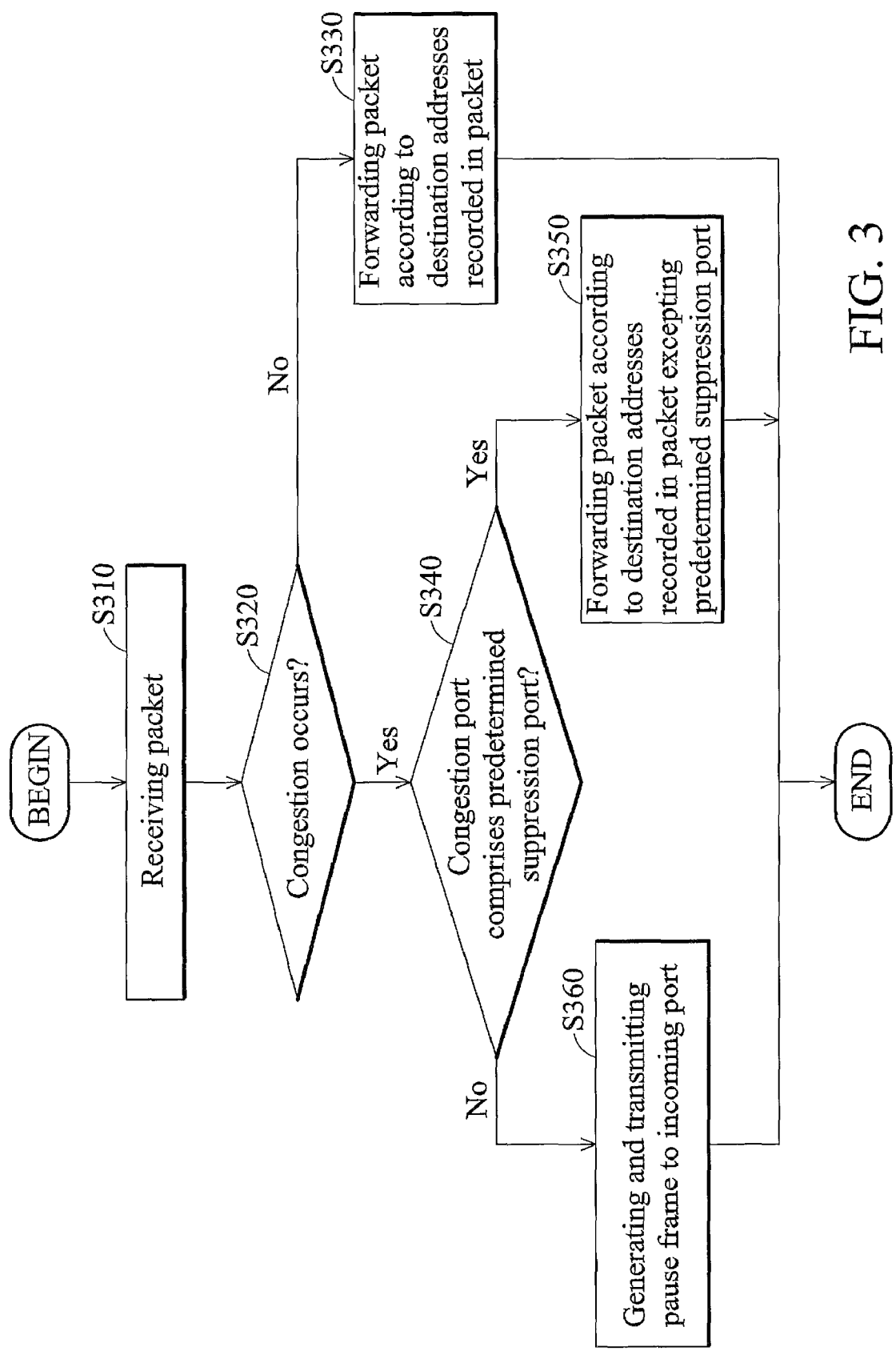
FIG. 3 is a flowchart of an embodiment of a method for packet forward control.

FIG. 3 is a flowchart of an embodiment of a method for packet forward control. In step S310, a packet is received by the processing module 210, and a forward port mask is generated according to the destination addresses recorded in the packet. The packet is a multicast or broadcast packet. In step S320, it is determined that whether congestion occurs on the ports. It is understood that the resource management module 211 determines whether at least one output queue of ports accumulates a huge mass of packets that amounts to a threshold value, and generates a congestion port window accordingly if congestion occurs. If no congestion occurs (No in step S320), and in step S330, the packet is forwarded to at least one of the ports according to the forward port mask, that is, according to the destination addresses recorded in the packet. It is understood that the switch operation and forwarding methods are well known, and are thus omitted herefrom. If congestion occurs (Yes in step S320), in step S340, it is determined that whether the congested ports comprise the predetermined suppression port according to the congestion port window and the suppression port mask. If so (Yes in step S340), in step S350, the packet is forwarded to at least one of the ports according to the destination addresses recorded in the packet excepting the predetermined suppression port. In some embodiments, step S350 is performed by searching valid ("1") bits in the suppression port mask, and ignoring the corresponding bits of the valid bits in the forward port mask. If not (No in step S340), in step S360, a pause frame is generated and transmitted to the incoming port transmitting the packet. After receiving the pause frame, the host connecting to the incoming port stops from transmitting the packet again via the incoming port. It is understood that the operation of step S360 is similar to conventional practice, and related detail operations are thus omitted herefrom.

Referring to FIGS. 4A to 4E, an example follows. In this example, port 1 of the switch is set a suppression port, where a suppression port mask is shown in FIG. 4D. A packet indicating to be forwarded to ports 1, 3 and 5 is received by the processing module 210, where a forward port mask 410 is shown in FIG. 4A. If congestion on port 1 is detected, where a congestion port window 420 is shown in FIG. 4B, a forward port window 450 as shown in FIG. 4E is generated according to the forward port mask 410 and the congestion port window 420, and the packet is forwarded to ports 3 and 5. If congestion on ports 1 and 5 is detected, where a congestion port window 430 is shown in FIG. 4C, a pause frame is generated and transmitted to the incoming port transmitting the packet, stopping the incoming port from transmitting packets again.

Figure 1A:
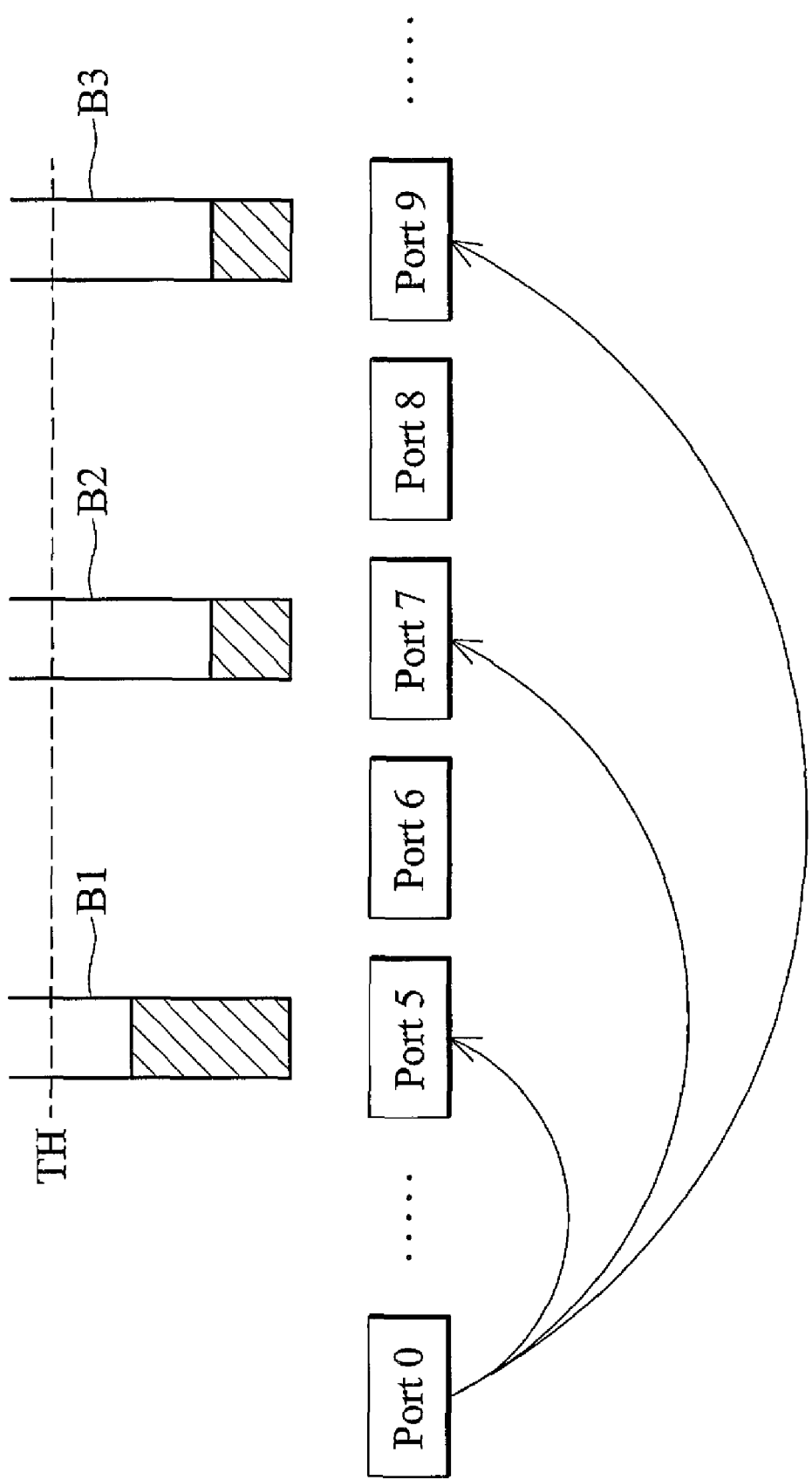
FIG. 1A is a schematic diagram illustrating packet multicasting.
Figure 1B:
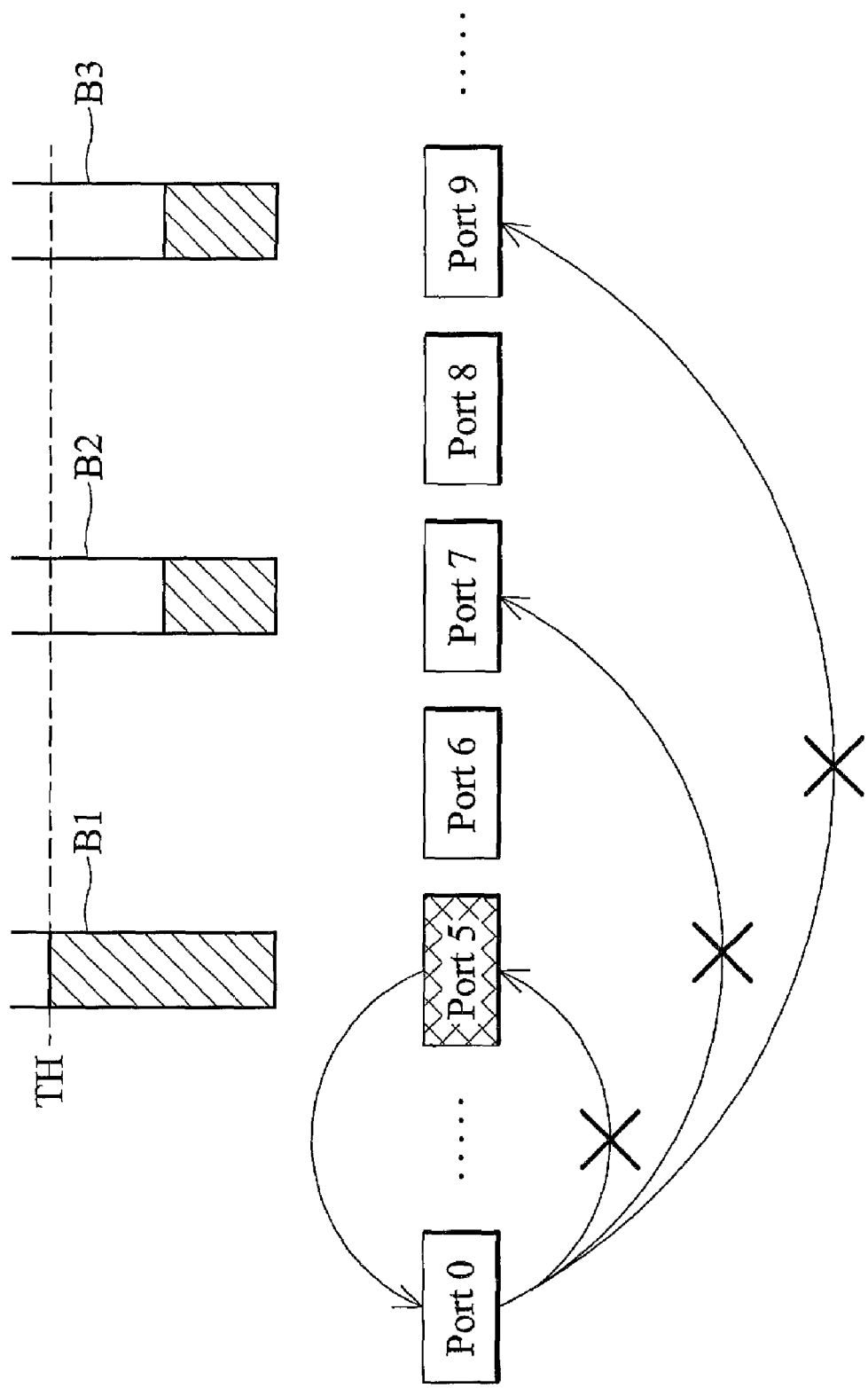
FIG. 1B is a schematic diagram illustrating port congestion.
Figure 5:
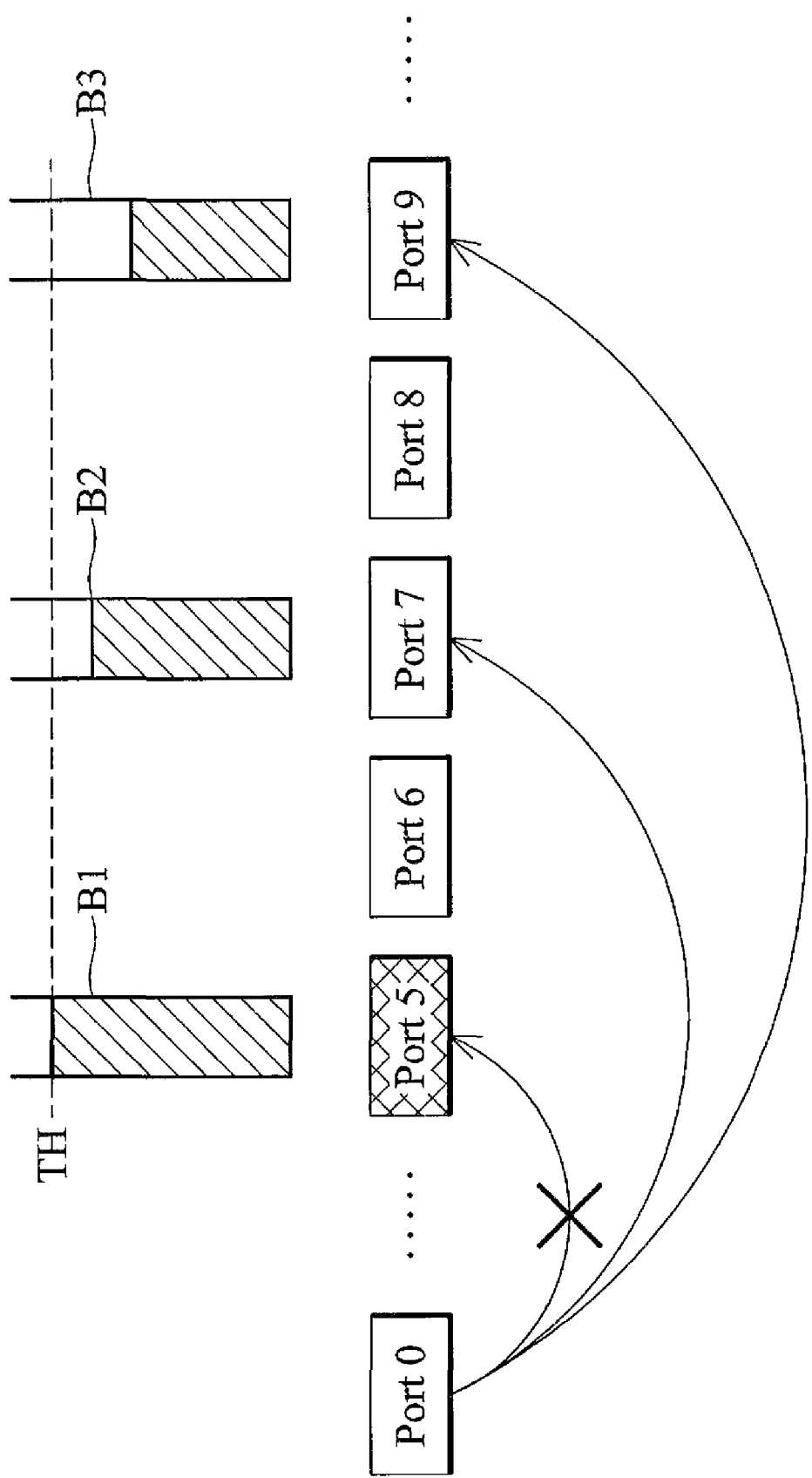
FIG. 5 is a schematic diagram illustrating an embodiment of packet forward control with port congestion.

FIG. 5 is a schematic diagram illustrating an embodiment of packet forward control with port congestion. Similarly to FIG. 1A, port 0 transmits packets to ports 5, 7 and 9 in a switch. Ports 7 and 9 connect to hosts operated at 100 MHz, and port 5 connects to a host operated at 10 MHz. In this embodiment, port 5 is set a suppression port. Since port 5 operates at 10 MHz, port 5 accumulates many packets in buffer B1, and causes packets in output queue B1 to approach the congestion status threshold value TH, resulting in port 5 congestion. In this embodiment, no pause frame is generated, packets are still transmitted to ports 7 and 9, and packets to be forwarded to port 5 are dropped.

Systems and methods for packet forward control, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A system for packet forward control, comprising:
a plurality of ports; and
a processing module receiving a packet, comprising:
a resource management module for detecting whether congestion occurs on at least one specific port among the ports; and
a forward control module for determining whether the at least one congested port comprises a predetermined suppression port within the ports, wherein the predetermined suppression port indicates that packets destined thereto are droppable if the predetermined suppression port is congested, forwarding the packet to at least one of the ports excepting the predetermined suppression port if the at least one congested port comprises the predetermined suppression port, and generating a pause frame to an incoming port transmitting the packet if the at least one congested port does not comprise the predetermined suppression port, so that the incoming port stops from transmitting packets again.

2. The system of claim 1 wherein the forward control module further forwards the packet to at least one of the ports according to at least one destination address recorded in the packet if no congestion occurs on the ports.

3. The system of claim 1 wherein the resource management module detects whether congestion occurs on at least one of the plurality of ports by determining whether the number of packets in an output queue of corresponding port approaches a threshold value.

4. The system of claim 1 wherein the packet is a multicast or broadcast packet.

5. A method for packet forward control for use in a plurality of ports, comprising:
receiving a packet;
detecting whether congestion occurs on at least one of the plurality of ports;
determining whether the at least one congested port comprises a predetermined suppression port within the ports, wherein the predetermined suppression port indicates that packets destined thereto are droppable if the predetermined suppression port is congested;
forwarding the packet to at least one of the ports excepting the predetermined suppression port if the at least one congested port comprises the predetermined suppression port;
generating a pause frame to an incoming port transmitting the packet if the at least one congested port does not comprise the predetermined suppression port, so that the incoming port stopping from transmitting packets again.

6. The method of claim 5 further comprising forwarding the packet to at least one of the ports according to at least one destination address recorded in the packet if no congestion occurs on the ports.

7. The method of claim 5 further comprising detecting whether congestion occurs on at least one of the plurality of ports by determining whether the number of packets in an output queue of corresponding port approaches a threshold value.

8. The method of claim 5 wherein the packet is a multicast or broadcast packet.

9. A method for packet forward control, comprising:
receiving a packet;
generating a congestion port window for indicating at least one congested port with output queue accumulating a number of packets that amounts to a threshold value;
providing a suppression port mask prior to the congested port becoming congested;
identifying at least one predetermined suppression port from the at least one congested port according to said congestion port window and the suppression port mask, wherein the suppression port mask indicates that packets destined to the predetermined suppression port are droppable if the predetermined suppression port is congested; and
transmitting the packet according to at least one destination address excepting the destination address with corresponding port indicated as valid in said suppression port mask.

10. The method as claimed in claim 9, further comprising:
generating a pause frame to a incoming port that inputs said received packet; and
stopping transmitting said received packet by said incoming port after said pause frame is received.

11. The method as claimed in claim 9, further comprising generating a forward port mask according to at least one destination address recorded in said received packet.

12. The method as claimed in claim 11, further comprising transmitting said received packet according to at least one destination address recorded in said received packet and said forward port mask if no congestion occurs.

13. The method as claimed in claim 11, further comprising:
searching a plurality of valid bits in said suppression port mask; and
ignoring the corresponding bits of said valid bits in said forward port mask.

* * * * *